Figure 1:
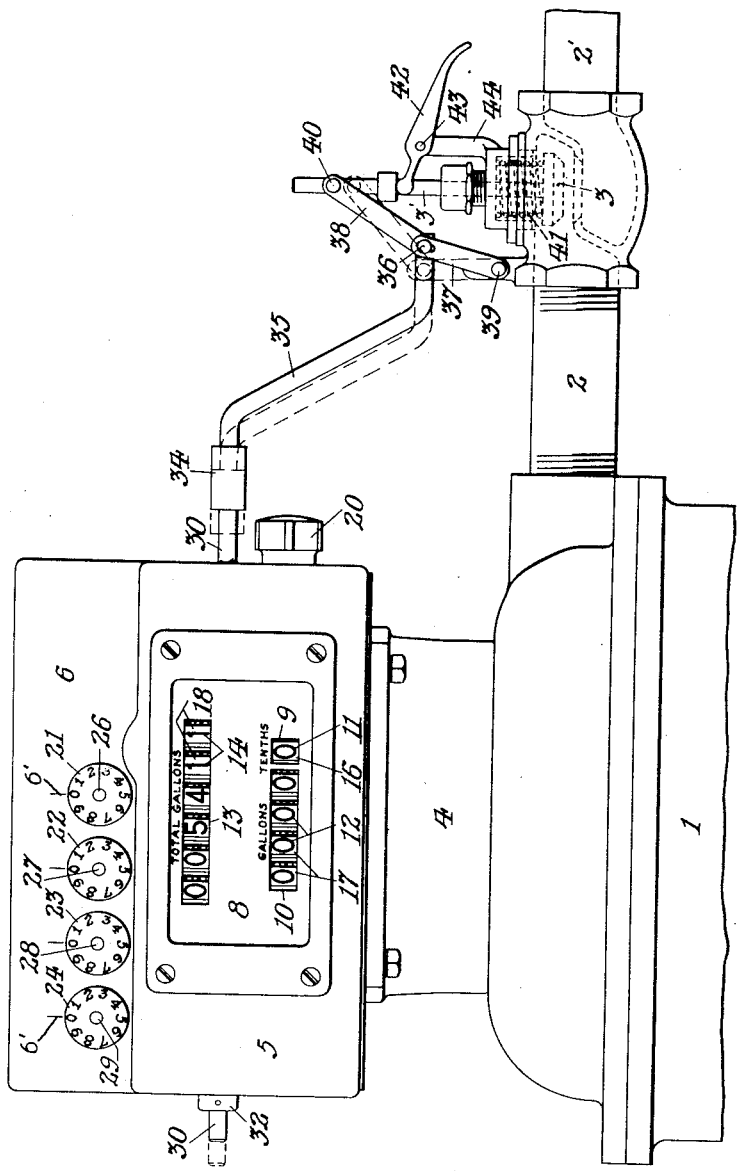

Nov. 16, 1937.  C. L. McMULLEN  2,099,129
FLUID DISPENSING APPARATUS
Filed Nov. 5, 1935   5 Sheets-Sheet 1

INVENTOR:
CARLTON L. MCMULLEN,
BY

Nov. 16, 1937.   C. L. McMULLEN   2,099,129
FLUID DISPENSING APPARATUS
Filed Nov. 5, 1935   5 Sheets-Sheet 2
*FIG. II.*
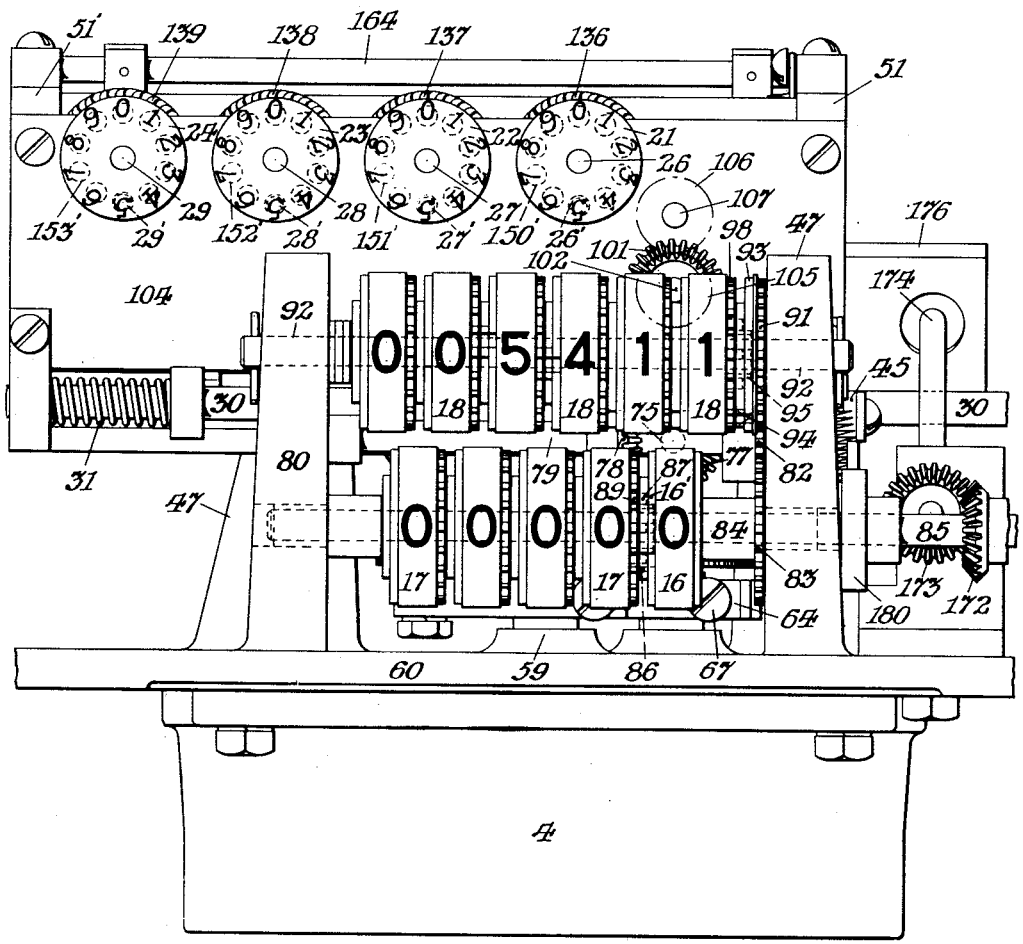
INVENTOR:
CARLTON L. McMULLEN,
BY

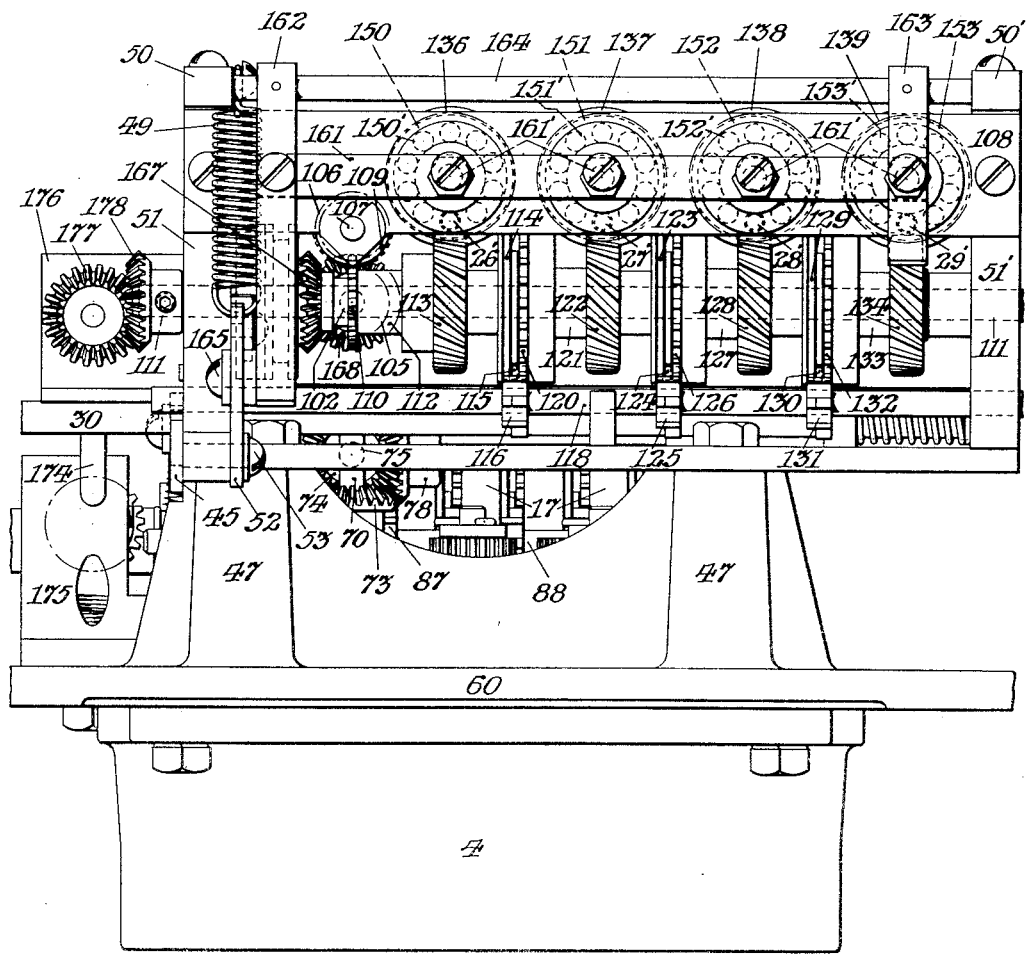

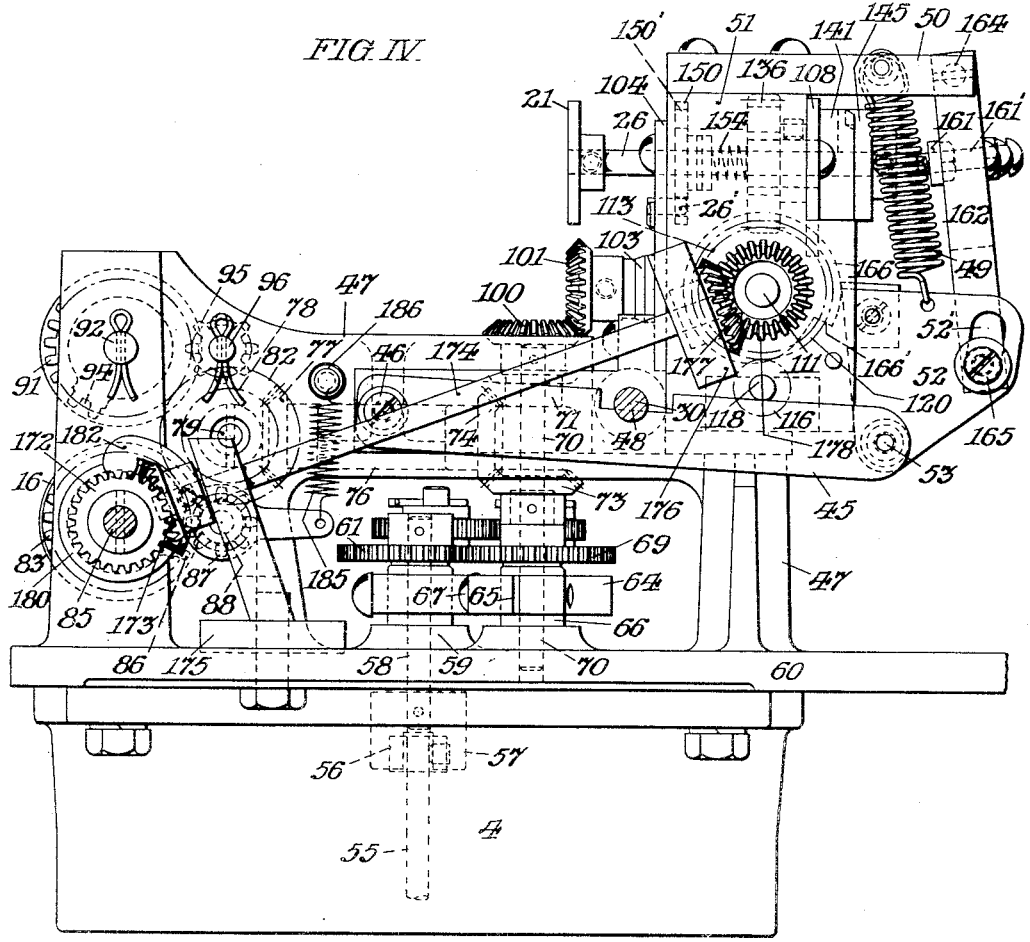

Nov. 16, 1937.  C. L. McMULLEN  2,099,129
FLUID DISPENSING APPARATUS
Filed Nov. 5, 1935   5 Sheets-Sheet 5
FIG. V.
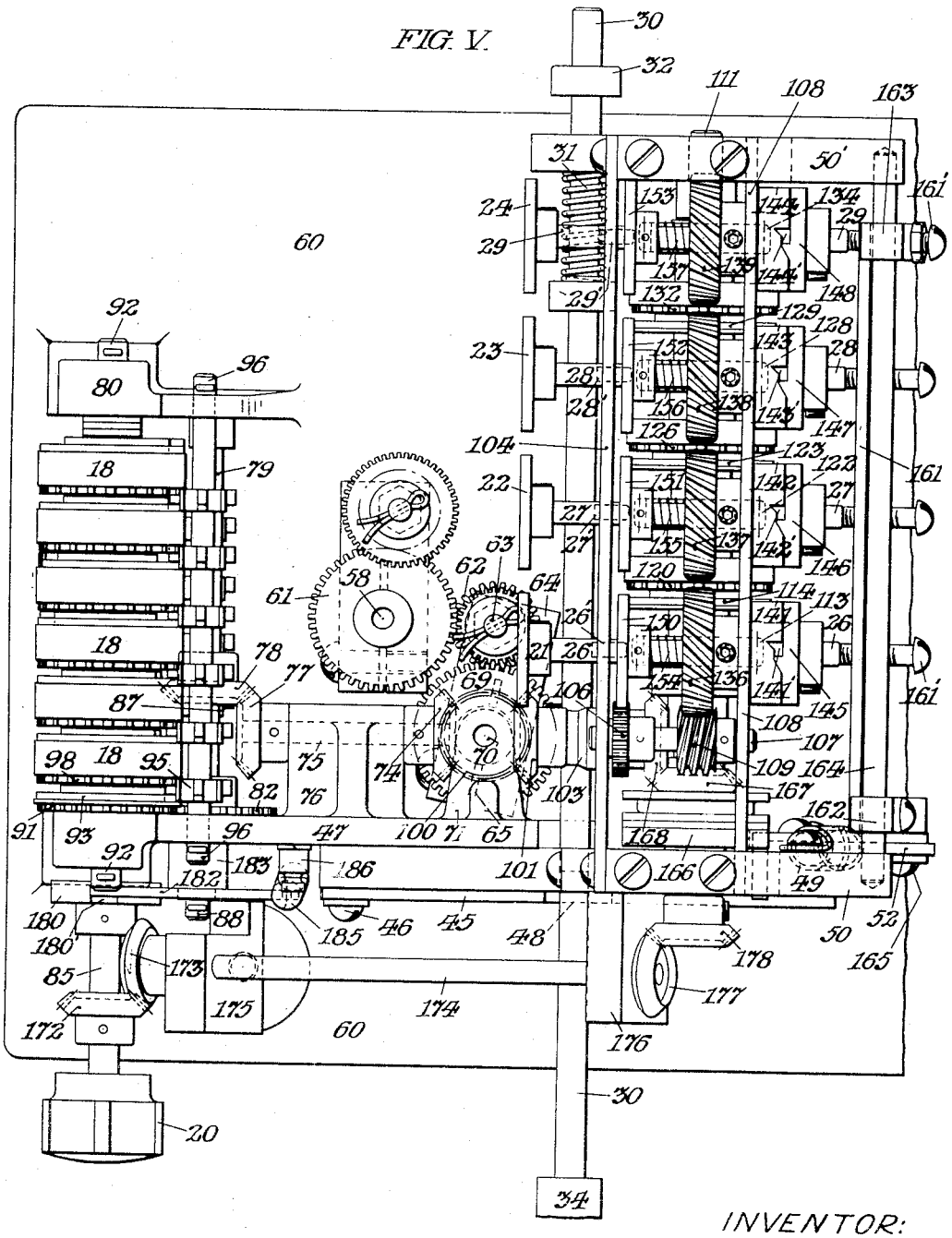
INVENTOR:
CARLTON L. McMULLEN,
BY Patented Nov. 16, 1937

2,099,129

UNITED STATES PATENT OFFICE 2,099,129

FLUID DISPENSING APPARATUS

Carlton L. McMullen, Llanerch, Pa.

Application November 5, 1935, Serial No. 48,275

3 Claims. (Cl. 235—132)

This invention is an improvement upon the invention described and claimed in my copending application Serial No. 34,879 filed August 6, 1935, for Letters Patent of the United States for Improvement in fluid dispensing apparatus, and is particularly applicable to apparatus including a meter through which gasolene or other fluid is forced, by a pump or other suitable means, to and through a flexible dispensing hose. Said meter is operatively connected with registering mechanism indicating the volume of fluid dispensed. In gasolene dispensing apparatus, such indication is conventiently in gallons and fractions of a gallon, but in gas apparatus is preferably in cubic feet.

In that apparatus, I provide means for identifying each individual dispensing operation with an individual serial number, and provide means to not only make a record of each such operation and the volume of fluid dispensed thereby, for the owner of the fluid used, but also duplicate that record upon a receipt for delivery to the customer, each such record and receipt having imprinted thereon not only the individual serial number of the instant transaction but also the serial number of the immediately preceding dispensing transaction to prevent any dispensing operation without a record thereof in its consecutive order. Such record of each sales transaction is begun by imprinting simultaneously upon the owner's record and the customer's receipt the serial number of the preceding sale; that imprint being made before the initiation of the instant dispensing operation; it being impossible to imprint the serial number for the instant sale record until the dispensing operation is actually begun.

In that apparatus, as is usual in dispensing apparatus, the operator must watch the indicating mechanism to determine when the desired volume of fluid has been dispensed and then manually stop the flow of fluid. Therefore, it is the object and effect of my present invention to save the time and labor of the operator in thus continually watching and manually controlling the dispensing operation, by providing means whereby the operator may instantly predetermine the volume of fluid which is to be dispensed by setting mechanism which will thereupon automatically control the flow of the fluid and stop such flow when the proper amount of fluid has been dispensed.

My invention includes the various novel features of construction and arrangement hereinafter more definitely specified.

In said drawings, Fig. I is a fragmentary front elevation of fluid dispensing apparatus conveniently embodying my invention.

Fig. II is a front elevation of the flow controlling and registering mechanism indicated at the upper left hand portion of Fig. I but on a larger scale and with the casing shown in Fig. I removed.

Fig. III is a rear elevation of the mechanism shown in Fig. II.

Fig. IV is an elevation of said mechanism as seen from the right hand side of Fig. II and the left hand side of Fig. III.

Fig. V is a plan view of said mechanism shown in Figs. II to IV inclusive and including at the lower left hand corner thereof the knob shown at the right of the casing in Fig. I, which is for resetting the registering mechanism to zero, and also showing the slide bar for operatively connecting the flow control mechanism with the valve indicated in Fig. I.

Referring to Fig. I; 1 is a casing of a meter from which fluid is dispensed through the pipe 2 under control of the valve 3. The adapter 4 which is rigidly connected with the top of said meter casing, conveniently by internal screw means, supports the casing 5 which contains in the lower portion thereof the mechanism for registering the volume of fluid dispensed through said meter and in the upper portion 6 thereof contains the mechanism for controlling the flow of said fluid and predetermining the volume dispensed at any operation. Said casing 5 has the window 8 with openings 9 and 10 through which there are visibly displayed numerals 11 and 12 respectively indicating the number of tenths of a gallon and gallons of fluid dispensed at the current operation. Said window also has the opening 13 through which are visibly displayed numerals 14 indicating the total aggregate volume of fluid which has been dispensed by successive operations. Said numerals 11 are included in a circumferential series on a decimally numbered wheel 16 and said numerals 12 are included in respective circumferential series on decimally numbered wheels 17. Said numerals 14 are respectively included in circumferential series on decimally numbered wheels 18.

Said wheels 16 and 17 may be set back to zero position at the end of each dispensing operation by means of the knob 20 projecting from the right hand end of said casing 5, as shown in Fig. I; but without setting back the wheels 18 which are advanced in correspondence with every advancement of the wheels 16 and 17.

The flow control mechanism includes the four knobs 21, 22, 23, and 24, each provided with a circular and decimal series of numerals respectively indicating gallons, tens of gallons, hundreds of gallons, and thousands of gallons. Said knobs 21 to 24 inclusive are respectively rigidly connected with shafts 26, 27, 28, and 29 which are journaled in the part 6 of the casing 5 and connected within the latter with elements of the flow controlling mechanism hereinafter described, which controls said valve 3 by the slide bar 30. Said bar 30 is manually shifted to the right as in Fig. I to open said valve, and automatically released and shifted to the left, to the extent indicated by the dotted lines in Fig. I, to close it, when the quantity of fluid predetermined by manually setting said knobs 21 to 24 inclusive is dispensed past said valve 3.

As shown in Fig. I, each of said knobs 21 to 24 is in the normal zero position with respect to respective index marks 6' on said casing member 6, but may be turned to present in registry with the respective index marks the numerals on the knobs which will represent the quantity thus predetermined to be dispensed. In the form shown, said knobs are graduated and numbered so as to predetermine the delivery of fluid only in whole gallons. However, any fractional part of a gallon may be delivered by manually operating said valve 3 independently of the flow control mechanism.

As shown in Fig. I, the slide bar 30 is at the extreme right hand end of its movement limited by the collar 32 on said bar coming in contact with the left hand end of the casing 5. The spring 31, shown in Figs. II and V, continually stresses said bar 30 toward that position. Said bar 30 is connected by the coupling 34 with the rod 35, the opposite end of which is connected by the pivot 36 with the toggle links 37 and 38. The link 37 is connected at its lower end by the pivot 39 with the casing of said valve 3. The link 38 is connected at its upper end by the pivot 40 with the stem 3' of said valve 3 so that, in the position shown, said valve is held open against the stress of the spring 41 which continually tends to shut it, and which is stronger than said spring 31. The lever 42 is fulcrumed at 43 on the bracket 44 supported by said valve casing, to enable the operator to open said valve, against the stress of said spring 41, to permit the fluid to be dispensed, after the operator has turned said knobs 21 etc. to predetermine the quantity to be dispensed.

Until automatically released, as hereinafter described, said valve 3 is held in the open position shown in Fig. I by the latch 45 which is a lever fulcrumed on the pivot stud 46 supported by the frame 47; which latch engages the shoulder 48 formed by recessing the lower side of said bar 30. Said latch is upheld in engagement with said rod by the spring 49. The upper end of said spring is connected with the bracket 50 on the frame member 51 which is rigidly connected with and supported by said frame 47. The lower end of said spring 49 is connected with the pawl 52 which, as shown in Fig. IV, is connected by the pivot 53 with the right hand end of said latch 45.

The power to automatically operate the mechanism above contemplated is derived from the flow of the fluid through said meter casing 1 under control of said valve 3; which flow turns the meter shaft 55 indicated in Fig. IV one revolution for each gallon of fluid dispensed. Said shaft 55 has at its upper end the coupling member 56 for detachable engagement with the coupling member 57 on the shaft 58 which is journaled in the bearing 59, part of the base plate 60 of said frame 47.

Said shaft 58 has fixed upon its upper end the gear wheel 61 which is in mesh with the gear 62 journaled on the stud shaft 63 carried by the bracket 64 which is bifurcated as indicated at 65, and clamped upon the bearing 66, part of said frame base 60, by means of the screw 67 indicated in Fig. IV. Said gear 62 is in mesh with the gear 69 which is fixed on the shaft 70 which is journaled in said bearing 66 and in the bearing 71 projecting inwardly from said frame 47, as shown in Fig. V.

Said shaft 70 has, rigidly connected therewith, the bevel gear 73 in mesh with the bevel gear 74 on the shaft 75 journaled in the bracket 76 projecting inwardly from said frame 47, as shown in Fig. V. Said shaft 75 has fixed upon its other end the bevel gear 77 in mesh with the bevel gear 78 which is fixed on the shaft 79 which is journaled in said frame 47 and in the frame 80 extending upwardly in unitary relation with said base plate 60 of the frame 47. Said shaft 79 has fixed thereon the gear 82 in mesh with the gear 83. As shown in Fig. II said gear 83 has the hub 84 carrying said decimally numbered wheel 16, indicating tenths of a gallon, and is loosely journaled on the shaft 85, which latter is supported in bearings in said frame members 47 and 80. The proportions of the gears aforesaid are such that said wheel 16 is turned, one revolution for each gallon of fluid dispensed, like said meter shaft 55.

Said wheel 16 carries at the left hand side thereof in Fig. II, two gear teeth 86 which are adapted to successively engage the eight teeth on the gear 87, indicated in Fig. IV, which is loosely journaled on the shaft 88. The teeth of said gear 87 are continually in mesh with the gear 89 on the first register wheel 17 adjoining said wheel 16 and which bears a circumferential decimal series of numerals each representing one gallon advance. Every other tooth on said gear 87 is extended so that what is the right hand end of said gear in Fig. II presents but four teeth in registry with the cylindrical edge 16' on said wheel 16 so that said wheel 17 is prevented from turning by engagement of two of the four teeth upon said cylindrical edge 16' of the wheel 16, except when the latter presents its two teeth to turn the gear 87.

Said wheel 16 is conveniently numbered in red. Each of said wheels 17 is decimally numbered like the wheel 16, but conveniently in black. Each digit on the first wheel 17 represents one gallon. The numerals on the second wheel 17 represent tens of gallons. The numerals on the third wheel 17 represent hundreds of gallons, and the numerals on the fourth wheel 17 represent thousands of gallons. The construction and arrangement are such that when said shaft 55 is turned one revolution, said numbered wheel 16 is turned one revolution, and the two teeth carried by the latter operate to advance the adjoining numbered wheel 17 one digit, thus indicating that one gallon of fluid has been dispensed by the instant operation. The other three numbered wheels 17 in said series are similarly connected by gears like the gears 87 and 89 so that the total number of gallons dispensed during the instant operation is manifested by the numbers on said wheels 16 and 17 displayed through the respective openings 9 and 10 at said window 8.

Said gear 82 on the shaft 79 is also in mesh with the gear 91 which is loosely journaled on the shaft 92 supported by said frame members 47 and 80. Said gear 91 has, rigidly connected therewith, the cylindrical disk 93, indicated in Figs. II and V, which carries the two teeth 94 which are adapted to successively engage the eight teeth on the gear 95 indicated in Figs. IV and V. Said gear 95 is loosely journaled on the shaft 96 which is supported in said frame members 47 and 80. The teeth of said gear 95 are continually in mesh with the gear 98 shown in Figs. II and V on the first register wheel 18, which bears a circumferential decimal series of numerals 14 each representing one gallon advance. Every other tooth on said gear 95 is extended so that what is the right hand end of said gear in Fig. II presents but four teeth in registry with the cylindrical disk 93 on said gear 91 so that said wheel 18 is prevented from turning by engagement of two of the four teeth of said gear 95 upon said cylindrical disk 93 on the gear 91 except when the latter presents its two teeth 94 to turn said gear 95.

The other five numbered wheels 18 in said series are similarly connected by gears like the gears 95 and 98 so that the total number of gallons dispensed by the aggregate of successive dispensing operations is manifested by the numbers on said wheels 18 displayed through the opening 13 at said window 8 shown in Fig. I.

Said shaft 70 has rigidly connected with the upper end thereof the bevel gear 100 in mesh with the bevel gear 101 which is fixed on the shaft 102 journaled in the bearing 103 which is rigidly connected with the frame plate 104 rigidly connected with the frame members 51 and 51' which are rigidly supported by said frame 47, as indicated in Fig. III. Said shaft 102 carries at its right hand end the gear 105 in mesh with the gear 106 on the shaft 107 which is journaled in said plate 104 and in the plate 108 likewise supported by said frame 47. Said shaft 107 has, rigidly connected therewith, the worm 109 indicated in Figs. III and V, which is in mesh with the worm gear 110. Said gear 110 is loose on the shaft 111 which is journaled in said frame members 51 and 51'.

Said gear 110 is in integral relation with the sleeve 112, the spiral gear 113, and the cylindrical disk 114 which has two teeth 115 which successively engage the eight teeth on the gear 116. Said gear 116 is loose on the shaft 118 which is supported and stationary in said bearing members 51 and 51' as indicated in Fig. III. The teeth of said gear 116 are continually in mesh with the gear 120 on the sleeve 121 which is in integral relation with the spiral gear 122 and the cylindrical disk 123. Every other tooth on said gear 116 is extended so that what is the left hand end of it in Fig. III presents but four teeth in registry with the cylindrical edge of said disk 114 carried by said sleeve 112, so that said gear 120 and the parts aforesaid in integral relation therewith are prevented from turning by engagement of two of the four teeth of said gear 116 upon said cylindrical edge of the disk 114, except when the latter presents its two teeth 115 to turn said gear 116.

Said disk 123 has two teeth 124 which successively engage the eight teeth on the gear 125, which is like the gear 116 and which is continually in mesh with the gear 126 on the sleeve 127 which is in integral relation with the spiral gear 128 and the cylindrical disk 129. Said disk 129 has two teeth 130 which successively engage the eight teeth on the gear 131 which is also like said gear 116 and is continually in mesh with the gear 132 on the sleeve 133 which is in integral relation with the spiral gear 134.

Said sleeves 121, 127 and 133 are each loosely mounted on said shaft 111 like the sleeve 112. Said spiral gears 113, 122, 128, and 134 are respectively in mesh with the spiral gears 136, 137, 138, and 139 which are loosely mounted on the respective shafts 26, 27, 28, and 29 of the manually rotary knobs 21 to 24 inclusive shown in Fig. II. Said spiral gears 136 to 139 inclusive are respectively rigidly fixed (by the set screws shown in Fig. V) on the hubs of the respective stop cams 141, 142, 143, and 144, which hubs are journaled in the frame plate 108 which is rigidly connected with said frame members 51 and 51'. See Figs. III and V.

The construction and arrangement last above described are such that said stop cams 141 to 144 inclusive are turned in definite relation to the dispensation of fluid through said valve 3, by the described gear means connecting them with the meter shaft 55.

Said stop cams 141, 142, 143, and 144 have respective cam recesses 141', 142', 143', and 144', which in the initial zero position of said knobs 21 to 24 inclusive are presented upwardly, as indicated in Fig. V, and receive the complementary projections on the respective setting cams 145, 146, 147, and 148, as shown in Fig. V. Said shafts 25 to 29 inclusive have respectively fixed thereon perforated setting collars 150, 151, 152, and 153. Each of said collars has a circular series of perforations respectively marked 150', 151', 152', and 153' in Figs. II and III, corresponding with the circular decimal series of numbers on said knobs 21 to 24 inclusive, as shown in Fig. II. Directly beneath each of the shafts 26 to 29 inclusive are respective stationary studs 26', 27', 28', and 29'; which studs are fixed in the frame plate 104 so as to normally project into the lowermost perforation of the respective collars 150 to 153 inclusive. Said collars and the shafts and setting knobs with which they are connected are respectively continually stressed axially toward the left in Fig. V by respective springs 154, 155, 156, and 157 interposed between the respective collars and the adjoining spiral gears 136 to 139 inclusive. Said setting cams 145 to 148 inclusive are respectively rigidly connected with the shafts 26 to 29 inclusive of said knobs 21 to 24 inclusive; so that when said knobs are manually thrust axially, to the right in Fig. V, to release them from the respective studs 26' to 29' inclusive and turned, in either direction, from their zero position shown in Figs. I and II, to set the flow control mechanism for any desired volume to be dispensed, the respective projections of said setting cams 145 to 148 inclusive ride upon the plane surface at the right hand end of the respective stop cams 141 to 144 inclusive, with reference to Fig. V.

The oscillatory tappet frame comprising the member 161 extending in opposition to each of said shafts 26 to 29 inclusive, as indicated in Fig. III, has lever arms 162 and 163 pendent from the rock shaft 164 with which they are rigidly connected, as indicated in Fig. III, and said shaft is journaled at its ends in the frame brackets 50 and 50', as shown in Fig. V. I find it convenient to provide said tappet frame member 161 with tappet screws 161' provided with jamb nuts so that said screws may be set in contact with the adjacent ends of said setting knob shafts 26 to 29 inclusive, so that any axial movement of any of said shafts to the right in Fig. V will displace said tappet frame to the right and hold it in such displaced position until each of said shafts has been restored to its initial axial position shown in Figs. IV and V by dispensation of the volume of fluid for which the control mechanism has been set. As shown in Fig. III, said tappet frame has projecting from its lever arm 162 the screw stud 165 which, as shown in Fig. IV, extends through the slot 52' in the pawl 52 and whenever any of said shafts 26 to 29 inclusive is axially displaced for a predetermined dispensing operation, said pawl is thus held with its tripping point out of the path of the tripping cam 166.

Said tripping cam 166 has the recess 166', indicated in dotted lines in Fig. IV, to receive the tripping point of said pawl 52 when the latter is released by the inward rocking movement of said tappet frame, under stress of the spring 49, when said setting cams 145 to 148 inclusive are permitted to move axially into the recesses of said stop cams when the latter have been turned by the operation of the meter to dispense through the valve 3 the volume predetermined by the manual adjustment of the knobs 21 to 24 inclusive.

Said tripping cam 166 is loose on said shaft 111 but adapted to be turned by its gearing connections with said meter shaft 55, in definite relation to the amount of fluid dispensed through said valve 3. Such gearing connections include the bevel gear 167 which is fixed on said cam and in mesh with the bevel gear 168 on the shaft 102 which is journaled in the bearing 103 supported by said frame plate 104, as indicated in Fig. V, and has fixed on its inner end the bevel gear 101 in mesh with said bevel gear 100 on the shaft 70 which, as above described, is turned by its gearing connections with said meter shaft 55. The construction and arrangement above described are such that when the predetermined volume for which the flow control mechanism aforesaid was set has been dispensed through said valve 3, said pawl 52, which has been dropped into said recess 166' slightly in advance of that event, is pushed down by the final turning movement of said tripping cam 166 to release said latch 45 from the slide bar 30 and thus permit said valve 3 to be shut by its spring 41 at the instant the precise volume predetermined for dispensation has been dispensed.

It is to be particularly noted that the knobs 21 to 24 inclusive remain in the position to which they are manually set, until they are manually reset; so that the numerals thereon representing units of volume, in cooperation with the index marks 31 on said casing member 6 shown in Fig. I, may be observed not only by the operator but by the customer, and manifest the volume of fluid which has been dispensed, in correspondence with the registration of said decimally numbered wheels 16 and 17 shown in Figs. I and II. Moreover, said wheels may be reset to their zero position shown in Figs. I and II without disturbing the manifestation of the knobs 21 to 24 inclusive of the quantity which has last been dispensed. Such resetting of the registering mechanism is effected by manually turning clockwise said knob 20 which is shown in Figs. I and V. Said knob 20 is rigidly connected with the shaft 85 on which is fixed the bevel gear 172 which is in mesh with the bevel gear 173 on the shaft 174 journaled in the brackets 175 and 176 shown in Figs. IV and V which are rigidly connected with the frame 47; said bracket 175 being directly connected with the base plate 60 of said frame. Said shaft 174 has fixed on its opposite end the bevel gear 177 in mesh with the bevel gear 178 which is fixed on the end of said shaft 111. Consequently, when said knob 20 is turned clockwise, said shafts 85 and 111 are simultaneously turned clockwise at the same rate. Each of said decimally numbered wheels 16 and 17 and the spiral gear wheels 113, 122, 128, and 134 and the tripping cam 166 are provided with internal one-way clutch means by which they are engaged with their respective shafts 85 and 111 to turn them backward to zero position as a consequence of the clockwise turning movement of said knob 20; the restoration of all of said wheels to the zero position being manifested by the zero marks on the wheels 16 and 17 when presented as shown in Figs. I and II. However, I find it convenient to provide means for indicating to the operator by a clicking noise when said wheels have been thus restored to zero position; which means are shown in Figs. IV and V including the collar 180 fixed on the shaft 85 and having the notch 180' to receive the end of the click lever 182 which is conveniently loosely fulcrumed on the bearing 183 projecting from said frame 47 in rigid relation therewith, as indicated in Fig. V. Said click lever is continuously stressed to engage the notch 180' in said collar 180 by the spring 185 which extends from the right hand end of said lever 182 in Figs. IV and V to the stud 186 fixed on said frame 47.

The mechanism above described may be operated as follows: With all of the decimally numbered wheels and knobs in the zero position shown in Fig. II, the operator may dispense any desired quantity of fluid through the valve 3 by manually opening the latter by the lever 42 to the position shown in Fig. I, with the effect of manifesting by the register wheels 16 and 17 any amount dispensed from one-tenth of a gallon to ten thousand gallons, without any predetermination of the amount dispensed. However, by manually turning the knobs 21 to 24 inclusive, the operator may predetermine and limit the volume of fluid to be dispensed at any dispensing operation from one gallon to ten thousand gallons. I find it convenient to leave said knobs 21 to 24 inclusive in any position to which they have been previously set, until it is desired to effect a succeeding dispensing operation and to then manually adjust them while the valve 3 is shut and before initiating the dispensing operation, the volume of which is to be thus predetermined. The operator may thus save some time in manipulation of the flow control in successively dispensing the same predetermined volume of fluid, for instance five or ten gallons; each such dispensing operation being, of course, automatically terminated upon completion of the dispensation of the volume of fluid for which said knobs 21 to 24 inclusive are set.

When the form of my invention chosen for illustration is embodied in a gasolene or other liquid dispensing apparatus of the curbstand type; said valve 3 is permanently connected, conveniently by the pipe 2' with a flexible hose having at the discharge end thereof a nozzle provided with a manually operative valve so that the operator may control the discharge of fluid at such nozzle whenever the valve 3 is open. However, when that form of my invention is embodied in a tank truck for what is known to the trade as "bulk delivery" of gasolene, lubricating oil, or other liquid, it is usual to provide the pipe 2' with a coupling with which a flexible delivery hose may be detachably connected. When the form of my invention shown is embodied in a gas or water distribution system, the pipe 2' may be rigidly connected with gas burners or water faucets through which the fluid is to be distributed.

Therefore, I do not desire to limit myself to the precise details of construction and arrangement herein set forth, as it is obvious that various modifications may be made therein without departing from the essential features of my invention, as defined in the appended claims.

I claim:

1. The combination with a shaft; of adjustable tripping mechanism for predetermining a number of revolutions of said shaft, including a manually rotary member which must be moved axially to free it for rotational movement to set it with reference to a series of numerals, detent means for temporarily detaining said manually rotary member in any selected position in which it is set, and means for automatically releasing said manually rotary member and permitting it to move axially toward its original position after the predetermined number of revolutions of said shaft.

2. The combination with a shaft; of adjustable tripping mechanism for predetermining a number of revolutions of said shaft, including a series of manually rotary members with respective axially movable shafts; setting cams respectively rigidly connnected with said shafts in definite relation with numerals on said manually rotary members; stop cams mounted to rotate in respective coaxial relation with said setting cams; spring means local to each of said shafts for thrusting the latter axially with their setting cams in contact with said stop cams; whereby said manually rotary members are held in the axial position to which they are selectively adjusted, until the stop cams are turned to a predetermined limit, when, by the movement of said stop cams, said spring means are permitted to restore said shafts and setting cams to their initial axial position.

3. The combination with a shaft; of adjustable tripping mechanism for predetermining a number of revolutions of said shaft, including a series of axially movable shafts, each having rigidly connected therewith a manually rotary member provided with a circular series of numerals and a setting cam in definite relation with the numerals on the respective rotary member; spring means for restoring said shafts and setting cams to their initial axial position; a slide bar; a latch for holding and releasing said slide bar; means for manually engaging said slide bar with said latch; a pawl pivotally connected with said latch; a cam for tripping said pawl and moved in accordance with the revolution of said first-named shaft; a spring continually stressing said pawl toward engagement with said tripping cam; and an oscillatory tappet frame having a member extending in opposition to each of said shafts at the cam ends thereof and pivotally connected with said pawl; whereby said pawl is held out of engagement with said tripping cam, by said tappet frame, whenever any one of said shafts is displaced from its zero position, and said pawl is released and tripped by said tripping cam to release said slide bar when the predetermined number of revolutions of said first-named shaft for which said manually rotary members have been selectively set have been effected.

CARLTON L. McMULLEN.